(12) United States Patent  (10) Patent No.: US 8,842,064 B2
Robinson  (45) Date of Patent: Sep. 23, 2014

(54) INTRA-PIXEL ILLUMINATION SYSTEM

(75) Inventor: Michael G. Robinson, Boulder, CO (US)

(73) Assignee: RealD Inc., Beverly Hills, CA (US)

( * ) Notice: Subject to any disclaimer, the term of this patent is extended or adjusted under 35 U.S.C. 154(b) by 705 days.

(21) Appl. No.: 12/341,795

(22) Filed: Dec. 22, 2008

(65) Prior Publication Data

US 2009/0160757 A1  Jun. 25, 2009

Related U.S. Application Data

(60) Provisional application No. 61/015,568, filed on Dec. 20, 2007.

(51) Int. Cl.
| | |
|---|---|
| G09G 3/36 | (2006.01) |
| H04N 13/04 | (2006.01) |
| G09G 3/00 | (2006.01) |
| G09G 3/34 | (2006.01) |
| G02F 1/1335 | (2006.01) |

(52) U.S. Cl.
CPC ......... *G09G 3/3426* (2013.01); *H04N 13/0418* (2013.01); *H04N 13/0422* (2013.01); *G09G 3/3611* (2013.01); *G09G 3/003* (2013.01); *G09G 2310/024* (2013.01); *G09G 3/3413* (2013.01); *G09G 2310/0235* (2013.01); *H04N 13/0459* (2013.01); *G02F 1/133526* (2013.01); *G09G 2320/068* (2013.01); *G02F 2001/133626* (2013.01)
USPC .......................................................... 345/102

(58) Field of Classification Search
USPC .................................... 345/6, 55, 83, 87, 102
See application file for complete search history.

(56) References Cited

U.S. PATENT DOCUMENTS

| | | | |
|---|---|---|---|
| 5,724,062 A | 3/1998 | Hunter | |
| 5,945,965 A * | 8/1999 | Inoguchi et al. | 345/6 |
| 6,243,055 B1 * | 6/2001 | Fergason | 345/32 |

(Continued)

FOREIGN PATENT DOCUMENTS

| | | |
|---|---|---|
| EP | 1489859 A2 | 12/2004 |
| EP | 1843319 A2 | 10/2007 |
| WO | 9406249 A1 | 3/1994 |

OTHER PUBLICATIONS

International Search Report and Written Opinion for PCT/US08/88026 mailed Feb. 19, 2009.

(Continued)

*Primary Examiner* — Nicholas Lee
(74) *Attorney, Agent, or Firm* — Neil G. Mothew; Darlene K. Kondo

(57) ABSTRACT

Methods and systems are disclosed to provide intra-pixel illumination to a modulating display panel, where regions of a pixel are provided incident light with controlled intensity and color at different periods of the panel's addressing cycle. This can lead to increased resolution beyond that intrinsic to the panel's physical make up, providing an enhanced resolution 2D panel, as well as a high resolution panel suitable for autostereoscopic purposes when used with a further lens array. For example, when the left hand side of all pixels are illuminated in one frame creating an image, and the right hand side of the pixels are illuminated within a second frame creating a further image, then the combined image, assuming temporal averaging, is twice the native resolution. Despite the temporal trade off, the eye's tolerance to local variation of color and intensity makes this feasible with realistic addressing periods.

30 Claims, 14 Drawing Sheets

(56) References Cited

U.S. PATENT DOCUMENTS

| | | | |
|---|---|---|---|
| 2005/0225502 A1* | 10/2005 | Nam et al. | 345/55 |
| 2005/0225630 A1 | 10/2005 | Childers et al. | |
| 2005/0280785 A1* | 12/2005 | Beeson et al. | 353/97 |
| 2006/0170834 A1* | 8/2006 | Kim et al. | 349/15 |
| 2007/0058034 A1 | 3/2007 | Numakazi et al. | |
| 2007/0096125 A1 | 5/2007 | Vogel et al. | |
| 2007/0109239 A1 | 5/2007 | den Boer et al. | |
| 2007/0109251 A1* | 5/2007 | Cernasov et al. | 345/102 |
| 2007/0200792 A1 | 8/2007 | Kim | |

OTHER PUBLICATIONS

International preliminary report on patentability from co-pending PCT/US08/88026 mailed Jul. 1, 2010.

Toyooka et al., "13.2: The 3D Display using Field-Sequential LCD with Light Direction Controlling Back-light," 2001 SID International Symposium, vol. XXXII, p. 174, XP007007639 (Jun. 3, 2001).

European Search Report from EP Application No. 08865219 dated Mar. 2, 2012.

European examination report for EP 08865219.3 dated Mar. 11, 2013.

\* cited by examiner

INTRA-PIXEL ILLUMINATION SYSTEM

CROSS REFERENCE TO RELATED APPLICATIONS

This patent application relates and claims priority to provisional patent application 61/015,568, entitled "Intra-pixel illumination system," filed Dec. 20, 2007, which is herein incorporated by reference for all purposes. This application was filed on the first working day following Saturday, Dec. 20, 2008, thus making this application timely filed pursuant to MPEP §2133.

BACKGROUND

1. Technical Field

Displays are broadly based on emissive or modulation technologies. The former create light at each pixel location, whereas the latter modulate light that flood illuminates the display panel. This patent disclosure generally relates to liquid crystal displays that modulate light that flood illuminate the display panel, and more specifically this disclosure relates to controlling the spatial and temporal characteristics of the illumination to such panels.

2. Background

Most LCD displays are illuminated with uniform static white light from a back light unit (BLU). Most BLUs have as their light source, cold cathode fluorescent lamps (CCFLs) that edge light diffusing waveguide sheets. The resultant light is emitted from the large area surface of the waveguide with good (though static) spatial, spectral, and angle uniformity. Images are then displayed by modulating the intensity of the incident light at individual pixel locations. Color is created by filtering out two of the three RGB primary color components of the white light at each pixel. Independent modulation of the remaining primary colors provides full color displays. The approach is very inefficient since two thirds of the available white light is absorbed in these filters and is wasted.

More recently, LEDs have been used to illuminate LCD panels, as they offer advantageous features such as long lifetime, instant on, mercury free etc. On the downside, these devices are more localized than the distributed CCFL and are inherently colored. Using them to illuminate large area displays with white light is more challenging, often resulting in unacceptable color uniformity. Advanced techniques are often used to avoid this using feedback with optical sensing. With sufficient control, LEDs can enhance displays through local area illumination, where different areas of the display are illuminated nearly independently. This is how scrolling and spatial dimming are implemented. The former reduces motion blur and allows for faster panel update, whereas the latter leads to increased effective bit depth in high contrast images. Both these approaches have been implemented in commercial products (e.g., Model LCD LN-T4681F by Samsung).

A further sophistication in local illumination is described in the commonly-assigned patent application Ser. No. 11/944,583, entitled "Illumination Systems for Visual Displays," filed Nov. 23, 2007, herein incorporated by reference. In this patent application, laser-like illumination sources provide local illumination on a pixel level. This approach, which can also be achieved with bright LEDs, provides separate red, green and blue illumination to panel pixels, removing the need for pixel color filtering—the so-called 'color filter array' or CFA. In this passive form, it yields not only much higher efficiencies than the incumbent approach, but also reduces panel costs through removal of the CFA.

A demand on resolution of LC panels occurs in autostereoscopic LCD displays. This allows the provision of 3D images to a viewer without any eyewear. Conventionally, autostereoscopic technology works by diverting each column of pixels to an individual eye, essentially halving the vertical resolution but providing a unique image to each eye. By displaying a correctly rendered image on the monitor it is then possible to trick the brain into believing that the two 2D images are a single 3D scene.

There are generally two ways of directing the light to each eye, either by using a parallax barrier or a lenticular lens. The two diagrams below illustrate how the light from "left" and "right" pixel columns reach the eye. FIG. 14 illustrates the parallax barrier technique, in which a mask or parallax barrier is placed over the LCD display which directs light from alternate pixel columns to each eye. Parallax barrier displays allow instant switching between 2D and 3D modes as the light barrier is constructed from a layer of liquid crystal which can become completely transparent when current is passed across, allowing the LCD to function as a conventional 2D display.

FIG. 15 illustrates the lenticular lens technique, in which an array of cylindrical lenses directs light from alternate pixel columns to a defined viewing zone, allowing each eye to receive a different image at an optimum distance. FIG. 16 illustrates that both the parallax barrier and the lenticular lens technique produce zones in which the viewer can see a 3D image and the head must be correctly aligned within these zones to comfortably view the scene. If the head is located outside of these zones then both image streams will reach each eye or the viewing positions will be inverted, both of which will cause comfort problems.

Owing to the splitting of the horizontal resolution between two images, a shortcoming of conventional LC panel autostereoscopic displays is that the horizontal resolution of the LC screen is effectively halved when displaying 3D images because half of the pixels are devoted to displaying the right eye image, while the other half of the pixels are devoted to the left eye image.

SUMMARY

Generally, the present disclosure addresses these problems and others to provide methods and system embodiments that use two-dimensional local control of incident light to increase resolution and affect the effective pixel shape and position. By increasing screen resolution and reducing the effective pixel shape, enhanced 2D and autostereoscopic 3D displays are enabled.

This disclosure covers the illumination of a modulating display panel with structured light, where structured light is defined as controlled temporal and spatial variation of both intensity and color. The present disclosure extends and enhances the local color scrolling approaches taught in commonly-assigned U.S. patent application Ser. No. 11/944,583, (entitled "Illumination Systems for Visual Displays," filed Nov. 23, 2007, herein incorporated by reference), to provide temporal variation of subpixel illumination. However, this disclosure considers spatial variations less than the size of any one individual modulating pixel making it distinct from related prior art, such as application Ser. No. 11/944,583. Such structured illumination additionally provides increasing effective panel resolution, custom intensity profiling, and positioning of effective pixel position. All are useful for improving conventional 2D displays, but their relevance to lenticular based autostereoscopic displays is perhaps where this illumination approach will be most beneficial (See e.g., L. Lipton and M. Feldman, "A New Autostereoscopic Display Technology: The Synthagram™," *Stereoscopic Displays and Virtual Reality Systems IX, Proc. SPIE* 4660, pp. 229-235, 2002, herein incorporated by reference).

Generally, system embodiments use temporally modulated illumination sources whose light is directed onto a monochrome direct view LCD panel using a spatial and angular multiplexed illumination engine. A micro-optical array sub-system adjacent the panel provides for local, replicated illumination. When used to illuminate a conventional LCD, higher resolution color displays can be realized. Incorporating a further lens array can enable a particularly pixel hungry autostereoscopic system where multiple images are provided for different viewing angles for a 3D.

This disclosure also provides a scheme for creating an illumination region within a pixel that acts to define a new 'effective' pixel or 'subpixel'. The effective pixels (or sub-pixels) are made smaller than the physical outline of the display's 'black matrix', and their shape and position is determined by virtue of the optical illumination subsystem. Since individual manipulation of every spot would otherwise require the information complexity of a second panel, the primary specific embodiments get around this requirement by employing an optical array sub-assembly (OAS) substantially adjacent the panel to replicate smaller sub arrays of illuminating spots. Furthermore, cylindrical micro-optical arrays are favored since they are easier to fabricate and alignment is simplified. With cylindrical lenses (or lenticular arrays as they are commonly called), illumination lines are produced which can approximate in the simplest case the RGB vertical color filter array stripes.

The teachings of application Ser. No. 11/944,583 are herein extended to include temporal manipulation of the illumination providing alternate Red, Green and Blue light to each pixel. Unlike other color sequential approaches, the local color manipulation provides for a uniform white spatially averaged illumination, and does not exhibit 'color break-up' artifacts so prevalent in field sequential systems such as those using DLP technology. With field sequential systems, bright rainbow-like flashes may often be seen in high contrast white on black images when the eye saccades across the screen. At modest frame rates, these are very noticeable and can only be suppressed by providing a field rate in excess of 500 Hz. Though possible with fast switching DLP technology, this is not an option with slower switching LCDs.

As taught herein, local color illumination on the pixel level uses an optical illumination system. In one of the embodiments described in application Ser. No. 11/944,583, angularly separated colored beams are incident on a cylindrical lens array, resulting in replicated colored stripes. Scattering mechanisms and other 'uncontrolled' optical effects are avoided. This disclosure, together with the teachings of application Ser. No. 11/944,583 represent a class of systems that project the illumination onto a direct view LCD panel (or equivalent) for sophisticated spatial, spectral and color manipulation for improving displays, and unlike rear projection systems, these illumination systems can be squeezed into physically thin BLUs since their system tolerance is significantly higher than imaging systems.

Stripes are formed at the focal length of a cylindrical lens array or lenticular sheet when the angular extent of the illuminating light is less than that defined by the numerical aperture (NA) of the lens elements. In other words, the stripes, which are an image of the effective illumination source are preferably narrower than the lens separation. To tailor the shape and size of each replicated stripe formed in this manner, the angular make-up of the illumination may be altered. Colored stripes can be created by illuminating a lenticular sheet with colored beams having distinct incident angles, and with the combined angular spread less than the lens NA.

One consequence of the angular difference of the light of each of stripe formed by this technique is that a viewer observes intensity variations as a function of viewing position. This undesirable characteristic can be corrected for by introducing optical correction elements close to or inside the panel, substantially in the plane of the pixels. Such optical elements could include a polarization preserving refractive field lens array matched in period to the input array. Simpler would be a 1D diffusing layer. In the near term, since only conventional non-optically correcting panels are available, external optical correction techniques are preferably used.

The simplest technique of correcting for the non-uniform field of view is to reduce the size of the stripes, decrease the angular difference between light forming the stripes, and image these stripes onto a diffuser external to the panel. This may be accomplished with extremely highly collimated beams such as those derived from lasers or very small high powered LEDs. If more cost effective, physically larger LEDs are used, then other approaches may be necessary. One technique is to make the system telecentric at the panel, thereby providing parallel beams passing though pixels. If the beams then remain separate by the time they emerge through the panel's glass substrate (i.e., its exit plane), a simple diffuser can be used to provide a good viewing angle with minimal angular variation. To achieve this, one technique is to introduce an aperture array at a focal length's distance in front of the input lens array. This unfortunately attenuates light to a level close to that seen in conventional CFA systems and thus offers few efficiency advantages, though increased resolution with controlled sub pixel illumination is still achieved. Other related approaches utilize more lens elements to concentrate the light though the telecentric apertures, improving efficiency. Additional lenses can also be added after the panel for relaying pixel images.

If sufficient diffusion at the panel's exit plane can be tolerated, then the problem reduces to separating the local illuminating beams at this surface. As discussed above, bright sources such as lasers enable this with the standard approach. Less bright LEDs, however, tend to overlap. Replacing the cylindrical lens sheet with a two-dimensional lens array can separate exiting beams in the vertical dimension.

The above techniques of controlling light through the modulating panel may form part of the disclosure's various embodiments that are described in further detail below.

The disclosure then provides embodiments which create the temporally modulated angular encoded illumination that is incident on the micro-optical lens array adjacent the modulating panel. The overall system lends itself (but is not limited) to projection optics, in which a physically small illumination engine provides all the passive and active control. This illumination is projected and magnified onto the modulating panel where a collimating Fresnel lens is located directly prior to the proposed lenticular system. The illumination engine is positioned at the focal plane of the Fresnel lens, allowing angle encoding through spatial intensity control. Hence, the light incident on the expanding lens at the exit of the illumination engine determines the final angles incident on the lenticular array. Temporal angle modulation is achieved in a first instance by illuminating different regions of this expanding lens with separate light sources that are turned on and off, as desired.

An alternative technique of angle encoding is to use deflecting optics at the exit of illumination engine. These can be in the form of mechanical mirrors or liquid crystal birefringent devices in accordance with the teachings of application Ser. No. 11/944,583. Yet another alternative is to use piezo-manipulation of the lenticular array as covered in the teachings. Although not strictly angular modulation, this approach causes the local illumination to move in a similar manner. This approach also avoids the angular issues with the static lenses discussed above. In general, mechanical approaches are less favored and the exemplary embodiments below concentrate on the temporal modulation of source arrays as a means of modulating incident angles.

Though this basic concept of a preferred approach is straightforward, an illumination engine should preferably provide uniformity with efficiency. More simply, light should form a matched uniform rectangular illumination at the panel with minimal light wasted. This design preference is similar to that of illuminating projection panels, so techniques to minimize light waste may be employed in this related system. Specifically, light pipes and paired lens arrays can be used to provide uniform rectangular light patches, which are combined at the panel yet have distinct incident angle sets. The first embodiment described in detail below is an example of such a system.

Described briefly so far is the ability to passively and actively control striped illumination on the panel with the assumption that the panel is updated globally. It assumes that pixels can simultaneously switch cleanly between different color values. However, most LCDs update in a scrolling manner that never provides a period during which a single settled image is viewable. So there is need to introduce either global addressing techniques or scrolling illumination (e.g., as disclosed in provisional patent application Ser. No. 60/979,330, filed Oct. 11, 2007, entitled "Globally updated liquid crystal display," herein incorporated by reference). The latter has more appeal as it can be incorporated into the custom illumination engine and would not require altering the LCD drive scheme and possibly panel electronics. Scrolling can be incorporated into the engine in a related manner as the angle control, taking care to control pupil and field planes separately, as will be clearly described in an embodiment below.

In some embodiments, the projected illumination may be folded to minimize the display size using conventional mirror systems, similar to those seen in rear projection TV cabinets. For many systems, this would be sufficient. More compact systems using thinner optical systems may be provided for use in laptop-type displays, for instance using conventional mirrors and/or curved mirrors. Another attractive method for making thin systems is to project the illumination into a thin dielectric wedge.

The techniques above are employed for subpixel illumination, where regions of a pixel are provided incident light with controlled intensity and color at different periods of the panel's addressing cycle. This can lead to increased resolution beyond that intrinsic to the panel's physical make up. For example, if the left hand side of all pixels are illuminated in one frame creating an image, and the right hand side of the pixels are illuminated within a second frame creating a further image, then the combined image, assuming temporal averaging, is twice the native resolution. There is, of course, a temporal trade off, but the eye's tolerance to local variation of color and intensity makes this feasible with realistic addressing periods.

Further to increasing resolution is the ability to place the illumination in controlled positions and with designed profiles. The illumination engine may provide angular profile that determines the illumination spot profiles, whereas the lens array system may determine illumination locations within pixels or at the exiting polarizer plane of the panel. In systems that are sampled, either where pixilated images are sub-sampled, or where the display itself is optically sub-sampled, as is the case for autostereo systems, creating a non-rectangular sampling array with minimal dark spacing between illumination spots can act to avoid aliasing effects and reduce pattern noise in the form of Moiré fringing.

DETAILED DESCRIPTION

Figure 1:
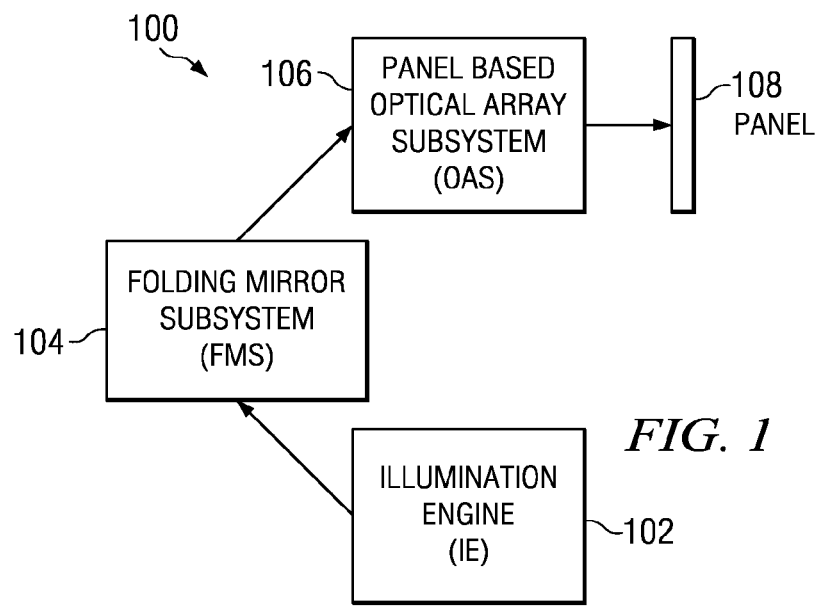
FIG. 1 is a schematic diagram showing the subsystems that comprise the inter-pixel illumination system, in accordance with the present disclosure.

FIG. 1 is a schematic diagram showing the subsystems that comprise an intra-pixel illumination system 100. Intra-pixel illumination system 100 includes an illumination engine 102, a folding mirror subsystem 104, a panel-based optical array subsystem (OAS) 106, and modulating panel 108. In general, illumination engine 102 provides illumination that is directed via folding mirror subsystem 104 toward panel-based optical array subsystem 106. Light is then directed toward modulating panel 108. In some embodiments of an intra-pixel illumination system 100, light from illumination engine 102 may be transmitted directly to OAS 106 without a folding mirror subsystem 104 in between.

Figure 2:
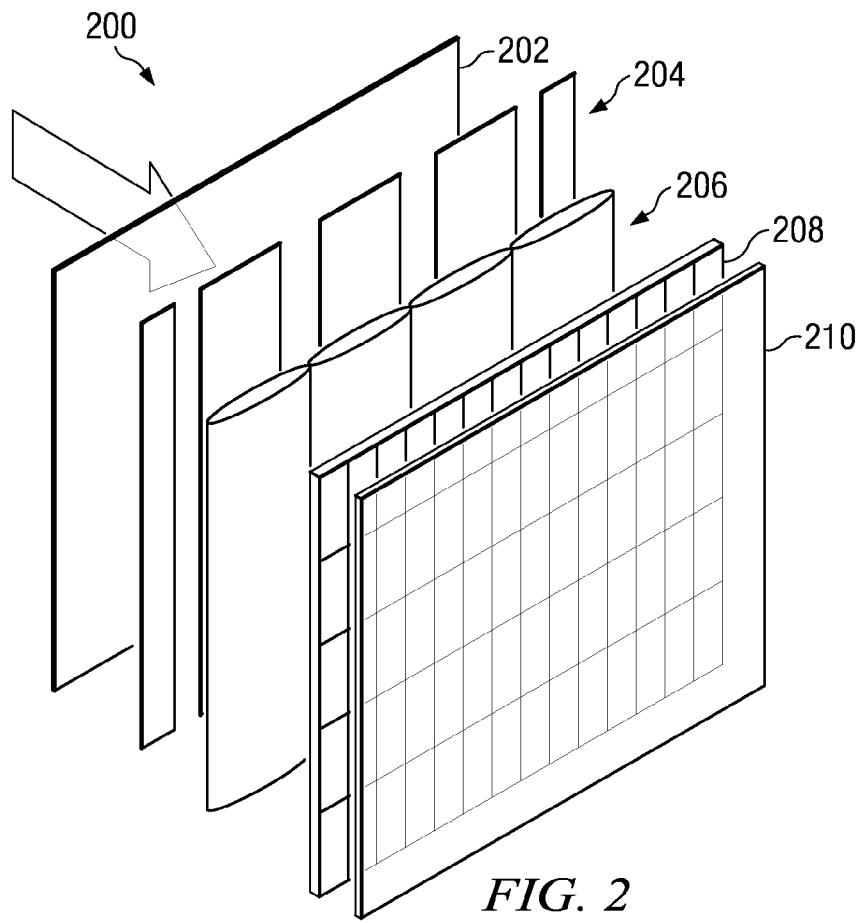
FIG. 2 is a schematic perspective diagram of a panel-based optical array subsystem (OAS) and FIG. 2A is a schematic diagram of the OAS viewed from above, in accordance with a first embodiment of the present disclosure.
Figure 2A:
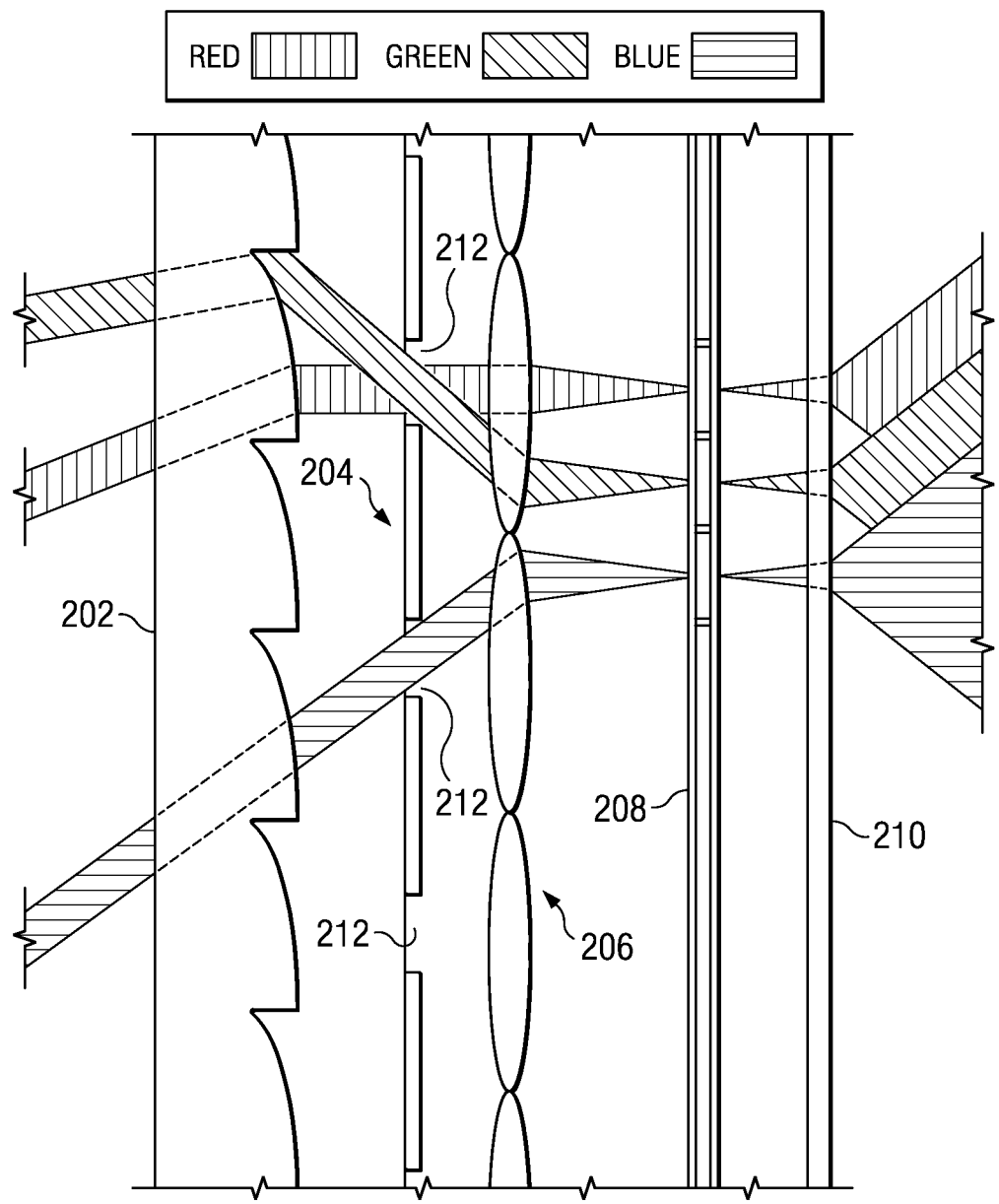

FIG. 2 is a schematic perspective diagram of a panel-based optical array subsystem (OAS) 200 and FIG. 2A is a schematic diagram of OAS 200 viewed from above. The panel-based OAS 200 of a first embodiment includes a collimating Fresnel lens 202, a vertically striped linear aperture array 204, and a vertically striped lens (cylindrical or lenticular) array 206. An exit diffuser 210 is used to spread out the light for uniform viewing.

Figure 5:
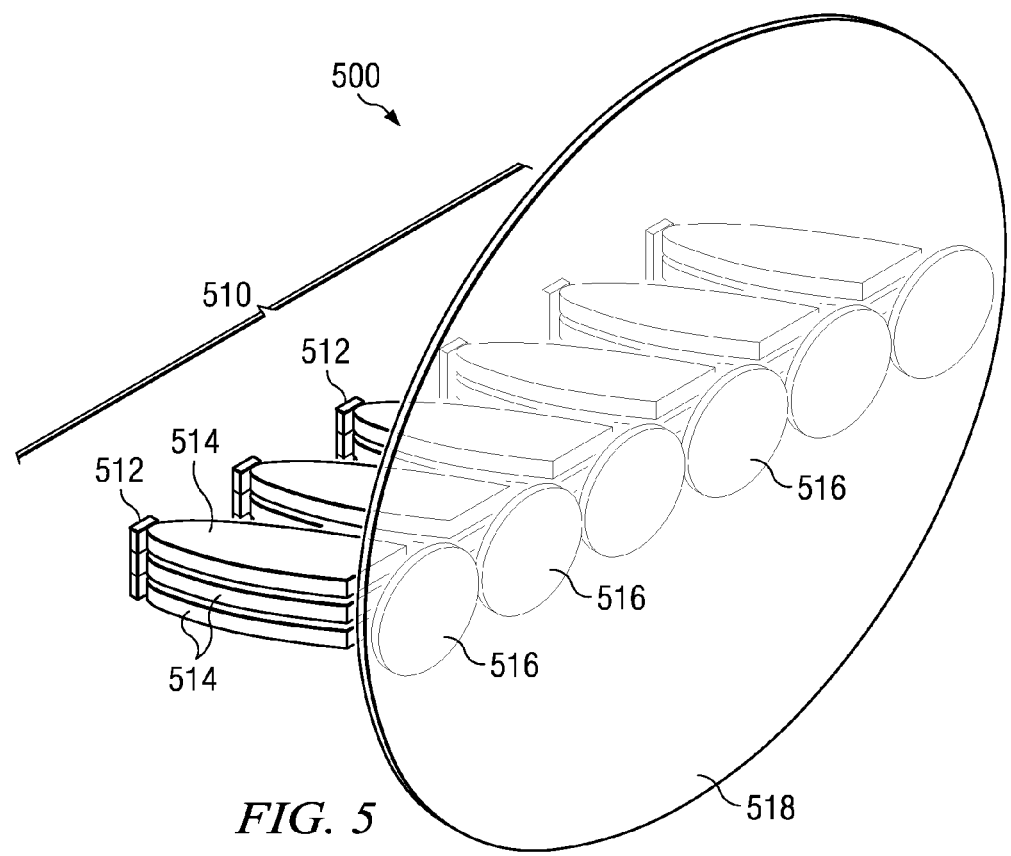
FIG. 5 is a schematic diagram illustrating an exemplary illumination engine, in accordance with the first embodiment of the present disclosure.

The Fresnel lens 202 is placed at its focal length from the illumination engine's exit pupil, which in this case is in the plane of the combining lens (e.g., combining lens 518 shown in FIG. 5). The light incident on the Fresnel lens 202 is thus collimated with small angular variations determined by the extent of the illumination within the exit pupil. The OAS 200 introduces an angular spread in the horizontal that corresponds to the physical make up of the source array entering the combining lens.

The aperture array 204 may have vertical black lines with a pitch matched to the lenticular lens array 206 and separated from it by one focal length's distance. In an embodiment, the pitch is chosen to be three times the native panel's pixel pitch, thereby providing R, G and B illumination lines that can be independently modulated. For the purpose of alignment, the aperture array 204 and lens arrays 206 may be implemented as opposite sides of the same substrate. Positioning an aperture 212 that is overfilled by the illumination at a focal length's distance from a lens element of lens array 206 provides telecentricity in cases where the light is not substantially vignetted by the lens elements of lens array 206. To avoid this, the apertures 212 may preferably be of a certain size determined by the angular extent of the transmitted light. In general, the aperture 212 will be slightly less than one $3N^{th}$ of the lens pitch of a lens element of lens array 206, where N is the number of illumination regions per pixel. Such small apertures slightly reduce the efficiency of the OAS 200 but no more so than a color filter array system when N=1.

In operation, the lenticular lens 206 array elements focus the illumination at their focal plane at LCD panel 208. By making this plane coincident with the LCD panel 208's pixel plane, the localized illumination can be created within the pixel's physical boundaries. Each subpixel illumination region may then be modulated in accordance with the addressed pixel state. If optical diffusion is carried out in this plane then this high resolution illumination pattern becomes what the viewer sees. In the near term, where conventional non-diffusing panels are used, the light propagates to the exit plane of the LCD panel 208 before diffusing. A first embodiment uses this technique of creating the desired viewing angle.

Figure 3:
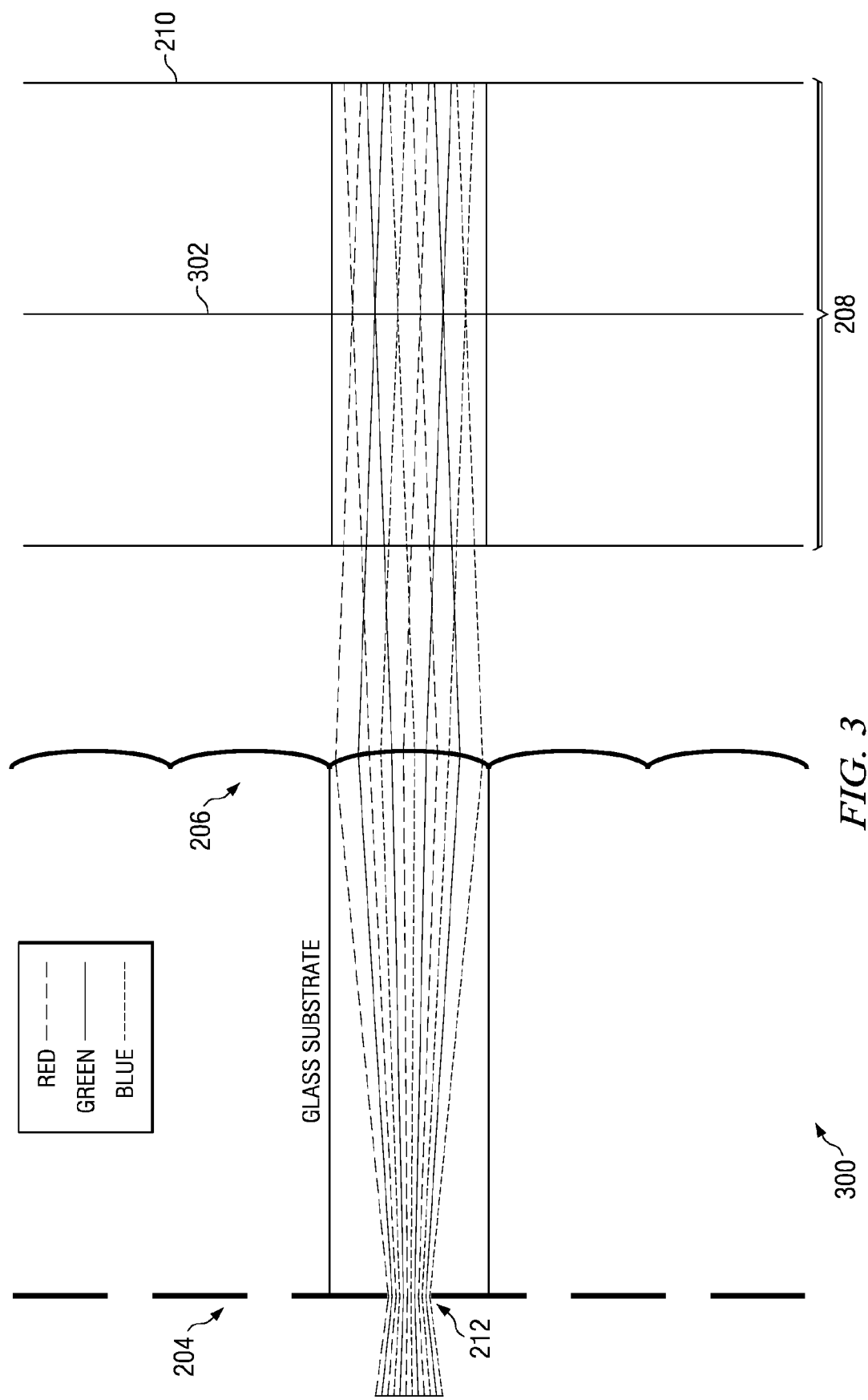
FIG. 3 is a schematic diagram showing a ray trace of an OAS in a first exemplary configuration, in accordance with the present disclosure.

FIG. 3 is a schematic diagram showing a ray trace 300 of an OAS 200 in a first exemplary configuration, providing an apertured telecentric system. Ray trace 300 illustrates that incident angles passing through the aperture 212 map onto positions in the focal plane of the lens 206 (the pixel plane 302 in this case). By adjusting the incident angular profile, the illumination patch at the pixel can be tailored. In this exemplary embodiment, aperture 212 is approximately 70 microns, the lens surface of each lenticular lens in lenticular lens array 206 has an 'r' value of 0.6 mm.

Figure 4:
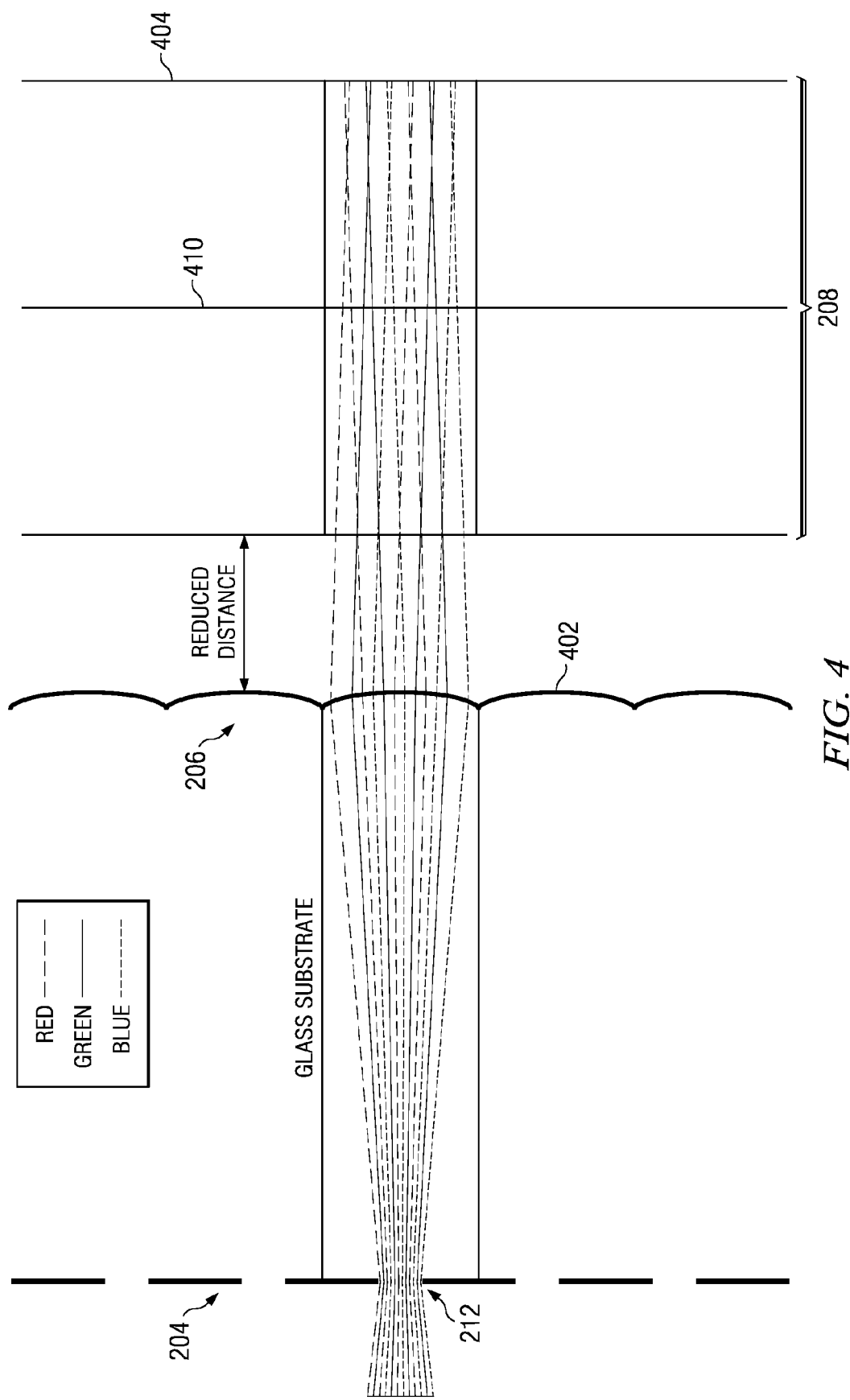
FIG. 4 is a schematic diagram showing a ray trace of an OAS in a second exemplary configuration, in accordance with the present disclosure.

FIG. 4 is a schematic diagram showing a ray trace 400 of an OAS 200 in a second exemplary configuration. FIG. 4 shows an alternative technique of controlling an effective illumination profile by moving the focal plane 402 of the lens 206 closer to the diffusing exit plane 404. Through appropriate angle profile encoding and micro-optical design, the viable illumination patches on the pixel plane 410 can be made to have soft edges, minimal surrounding dark space, and non square grid placing. The last effect may be created by tilting the lenticular lens array 206 and aperture array 204 with respect to the vertical. All these modifications can both improve the resultant 2D image and help with moiré pattern suppression in derived autostereoscopic systems.

FIG. 5 is a schematic diagram illustrating an exemplary illumination engine 500 in accordance with the first embodiment. Generally, illumination engine 500 includes an M×3N two dimensional source array 510 with each source capable of emitting Red (R), Green (G) or Blue (B) primary illumination. M and N are integers where M is the number of scrolling stripe regions and N, the number of subpixel illumination spot sets in the display system. The specific example shown in FIG. 5 has N=2 and M=3, enabling a three stripe scrolling system with six replicated vertical illumination lines. From a practical standpoint, light source sources in the two dimensional source array 510 may be LED packages 512, each including separated R, G and B emitters (e.g., OSRAM's OSTAR package). Alternatively, optically superimposed chromatic sources can be used, which can improve system efficiency by preserving the individual source étendue.

Each light source 512 is coupled directly into a waveguide or 'light pipe' 514 to provide mixing. The light exiting the waveguide 514 is uniform, and can be manipulated in color by modulating the individual colored LEDs of the entrance source package. The light pipes 514 are grouped together vertically, producing a combined output emitting surface of proportions matched to the final LCD panel. Images of these separate emitting surfaces are formed at infinity by an array of imaging lenses 516, each of which is situated at its focal length from the output of the combined light pipes 514. All images from lens 516 are effectively superimposed at infinity since the lateral spacing between the replicated systems can be neglected compared with the infinite size of the image.

A combining lens 518 acts to map the combined images from imagine lenses 516 onto a plane situated at its focus. The magnification of the combined illumination patch is in proportion to the focal length ratio of the combining lens 518 and imaging lenses 516.

By turning on a single light source (e.g., LED) 512 in the M×3N array, it is possible to illuminate the panel in a single scrolling stripe region and with a particular set of illumination angles. The vertical position of a light source (e.g., LED) 512 in the array is mapped to a corresponding scrolling stripe region on the LCD panel, whereas its horizontal position in the array determines its angle exiting the Fresnel lens of the OAS 200. The striped positioning of illumination enables scrolling through the scrolling stripe regions (vertical scrolling), which in turn acts to increase the effective update rate of the panel. This will become apparent when the overall operation of the system is discussed below.

Figure 6:
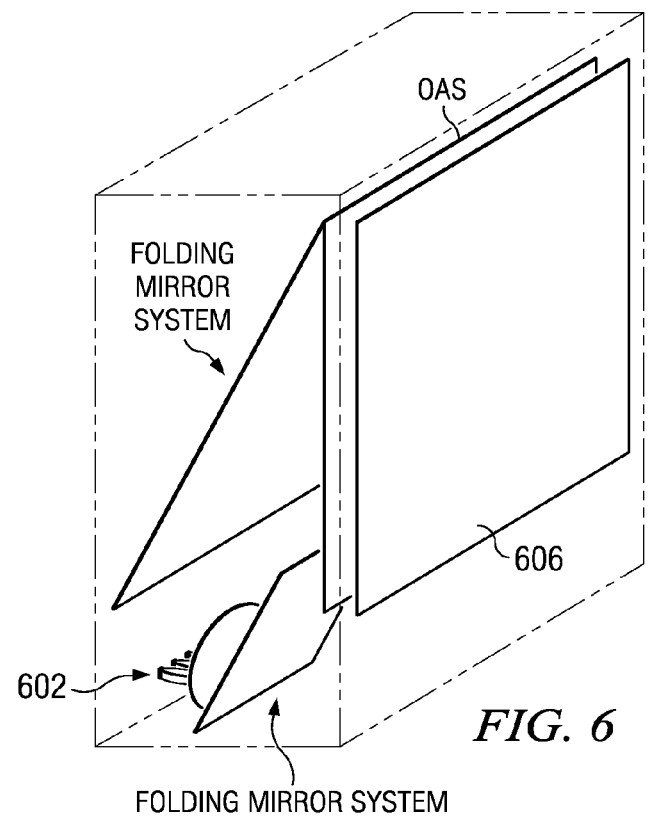
FIG. 6 is a schematic diagram of an exemplary display system in accordance with a first embodiment of the present disclosure.

FIG. 6 is a schematic diagram of an exemplary display system 600. Display system 600 includes an illumination engine 602 that utilizes a folding mirror system (FMS) 604 to direct the expanding illumination from illumination engine 602 toward the display panel 606, reducing system volume. It should be apparent that various different configurations of mirrors may be used in FMS 604 to achieve a reduced system volume, in conveying light from illumination engine 602 to display panel 606.

FIGS. 7a-7d are schematic diagrams illustrating the temporal operation of Intra-pixel illumination system 700. The folding mirror system 602 of FIG. 6, which is optional in some embodiments, has been removed for the sake of clarity.

Figure 7A:
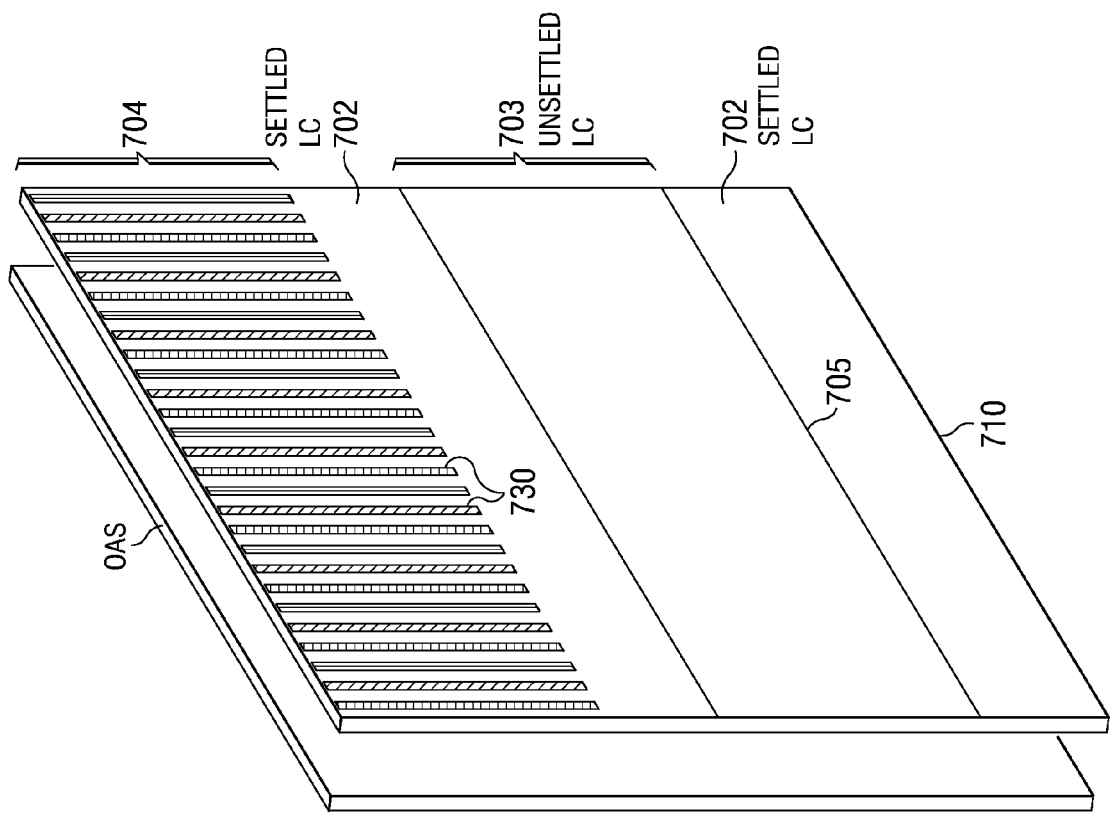
FIGS. 7a-7d are schematic diagrams illustrating the temporal operation of intra-pixel illumination system, in accordance with the present disclosure.

FIG. 7a is a schematic diagram illustrating operation of intra-pixel illumination system 700 for illumination of a first scrolling stripe region during a first frame. Here, the modulation values on each of the pixels for a specific illumination have been addressed up to the current address line 705 using a conventional line-by-line active matrix scheme. The liquid crystal (LC) settles over a finite period into the desired state in accordance with the charge deposited on the pixel supplied during addressing, providing a settled region 702. The settling period relates to an unsettled LC region 703 immediately preceding the current addressed line 705 over which the LC state is undetermined. Above this unsettled LC region 703, the LC is settled in settled region 702. Once the settled region 702 substantially fills a scrolling stripe region, which for the case of the present example in FIG. 7a is the first third of the panel 710 in scrolling stripe region 704, then the bottom row LEDs 722 of Illumination Engine (IE) 720 can be turned on, illuminating the top third of the panel 710 in a first scrolling stripe region 704. All other scrolling stripe regions are not illuminated, effectively hiding the addressing and settling of the LC. In this exemplary embodiment, there are three discrete sets of illumination angles making up the illumination, corresponding to the LED sources of the bottom row 722 of the IE 720, which form local illumination stripes 730 at the panel's pixel plane. Here, we choose to illuminate the right sides of every third pixel with stripes colored Blue 732, Green 734, Red 736, Blue 732 . . . et cetera.

Figure 7B:
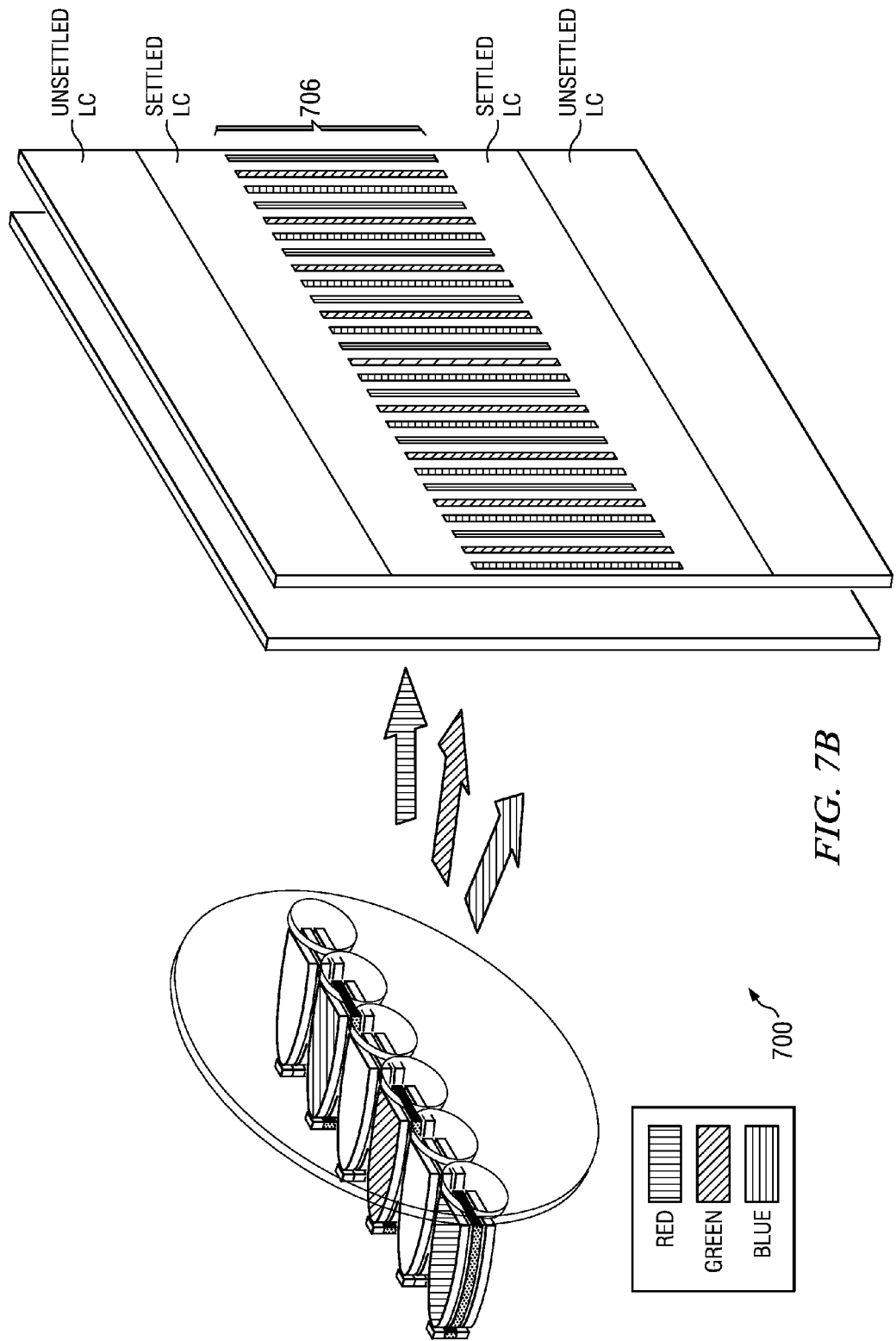

FIG. 7b is a schematic diagram illustrating operation of intra-pixel illumination system 700 for illumination of a second scrolling stripe region 706 during a first frame. In operation, once the LC addressing has proceeded and the second third of the panel's LC has settled, the sources corresponding to the second line of the source array are turned on, providing illumination to the second scrolling stripe region 706 with the same local illumination striped pattern as in the example of FIG. 7a. The LEDs corresponding to the first scrolling stripe region 704 are now turned off, allowing the pixels in this region to be addressed with the subsequent frame's modulation values. It is assumed here that the LC settling time is approximately one-third of the frame period. At this stage, the third scrolling stripe region cannot be illuminated as the last line has yet to settle.

Figure 7C:
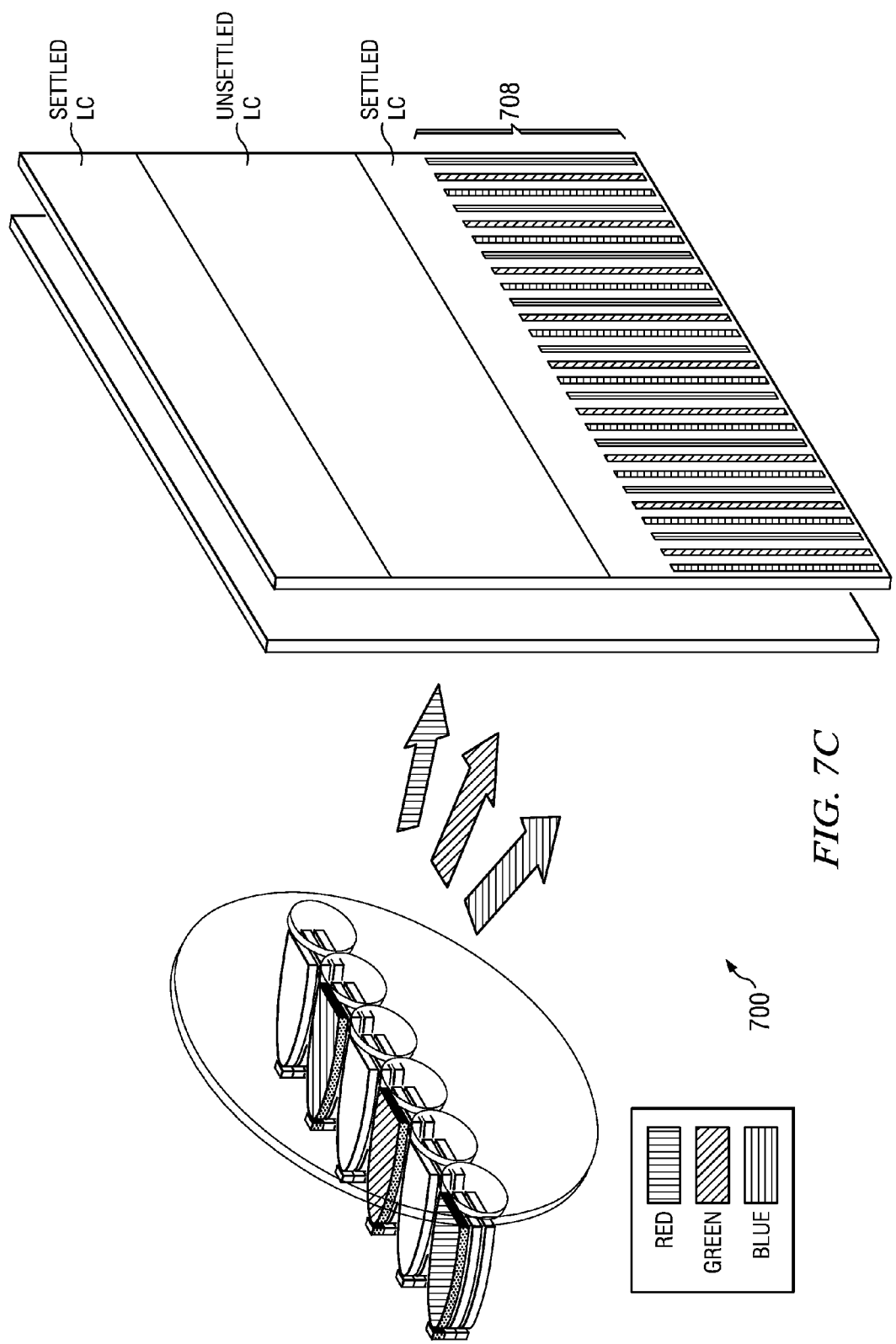

FIG. 7c is a schematic diagram illustrating operation of intra-pixel illumination system 700 for illumination of a third scrolling stripe region 708 during a first frame. Here, illumination area 708 is further stepped down from illumination area 706 of FIG. 7b, using the same local illumination striped patterns as in the example of FIGS. 7a & 7b, above.

Figure 7D:
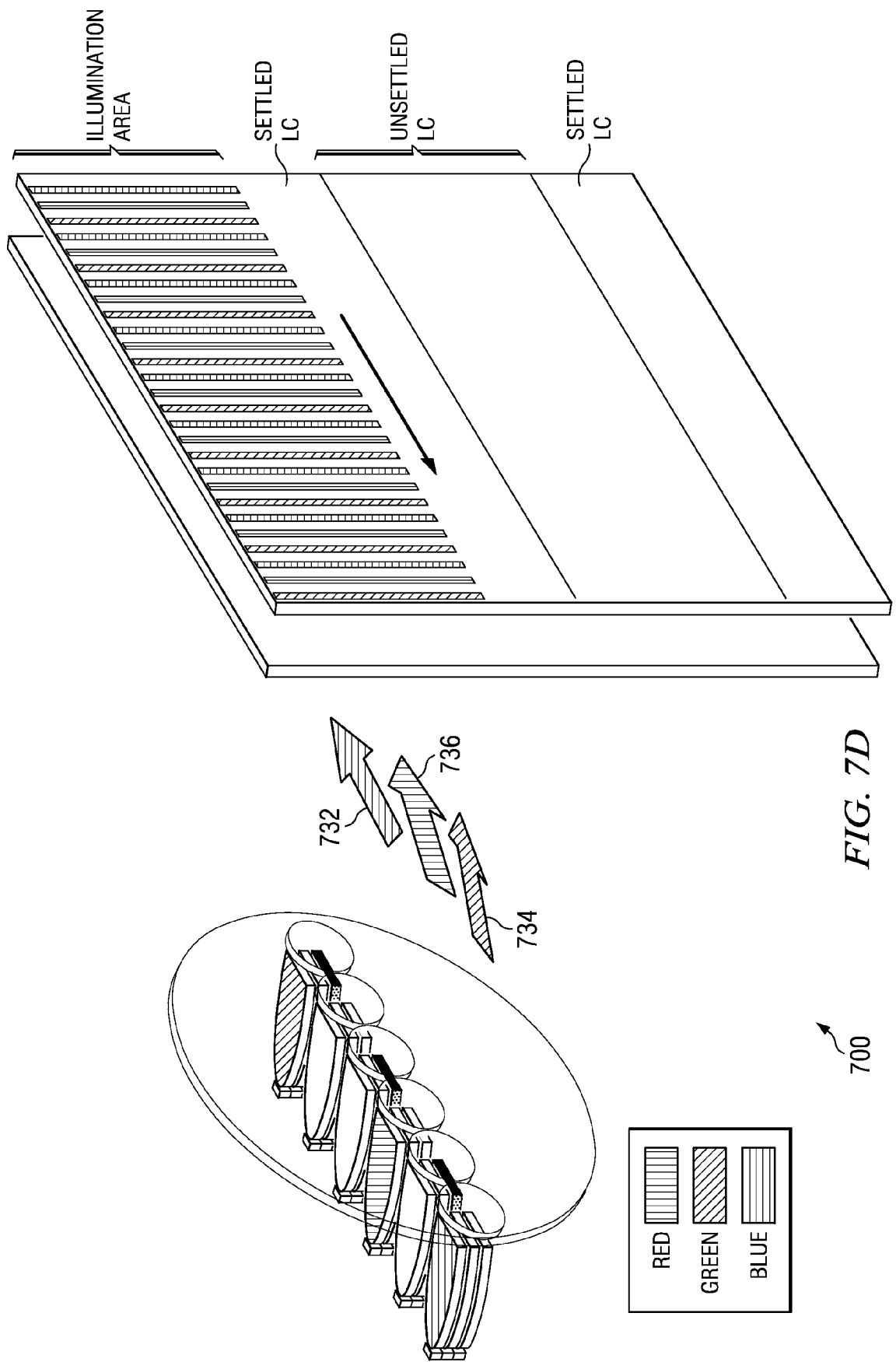

FIG. 7d is a schematic diagram illustrating operation of intra-pixel illumination system 700 for illumination of a first scrolling stripe region 704 during a second frame (a new illumination frame). Here, the first scrolling stripe region 704 is illuminated, but with a different local illumination pattern corresponding to G, R, B, G, et cetera, . . . , illuminating the right sides of every third pixel. Accordingly, the illumination stripes effectively move half a pixel. A similar addressing and illumination cycle is performed for the second frame, for the second and third scrolling stripe regions 706 and 708, in which the same local illumination stripe pattern sequentially illuminates the LC panel as that described for the FIG. 7d sequence.

It should now be apparent that with these exemplary illumination cycles, that a first image, say for a left eye image, can be illuminated. Then in a subsequent illumination cycle, a second image, say for a right eye image can be illuminated. Under such a scheme, the left eye image may be imaged by a left side of subpixels or 'effective' pixels and the right eye image may be imaged by a right side of subpixels.

Figure 8A:
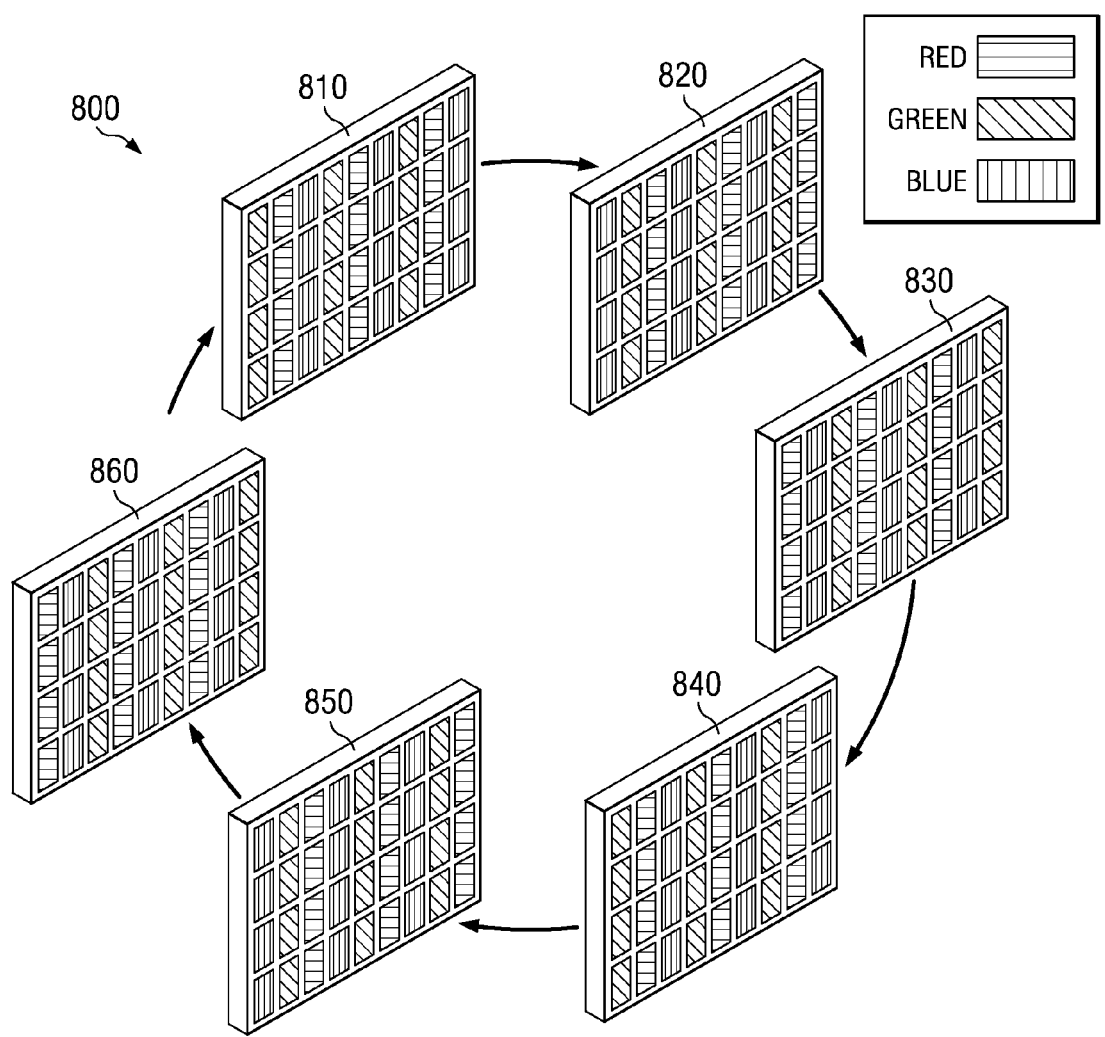
FIG. 8a is a schematic diagram showing an exemplary complete illumination cycle taking six addressing frames, in accordance with the present disclosure.
Figure 8B:
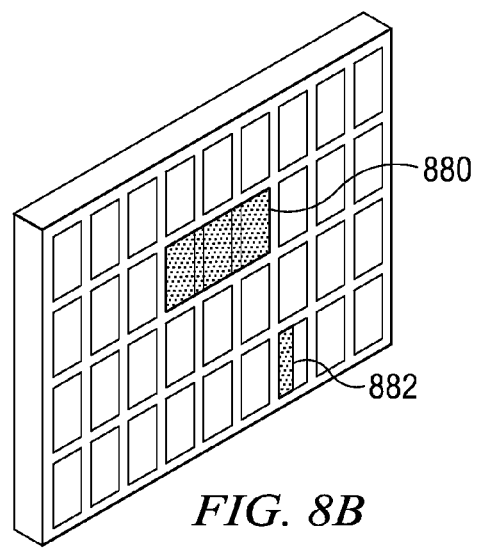
FIG. 8b is a schematic diagram showing the resulting six-fold decrease in an 'effective' pixel size, compared with the pixel size on a conventional LC display that uses the conventional color filter array technology, in accordance with the present disclosure.

FIG. 8a is a schematic diagram showing an exemplary complete illumination cycle 800 including six addressing frames 810, 820, 830, 840, 850, and 860. As may be seen, the sequence cycles from G, B, R, . . . , G, B, R in frame 810, to R, G, B, . . . , R, G, B in frame 820, and so on (as shown) for frames 830, 840, 850, and 860. Also shown schematically in FIG. 8b is the resulting six-fold decrease in the 'effective' pixel size 882, compared with the original pixel size 880 when the LC display uses the conventional color filter array technology. In accordance with the present disclosure, the illumination scheme is feasible without resorting to excessive frame rates. Relatively slow update can be tolerated due to the eyes insensitivity to temporal variation of color and intensity at a local level near to its limiting resolution. An example of this is the interlaced update used with conventional NTSC TV systems. In such an example, all odd lines and all even lines are written alternately, creating a full resolution image every $\frac{1}{30}^{th}$ of a second. The local intensity of any given pixel is thus 30 Hz, whereas the global intensity varies at a flicker free 60 Hz. In other words, a high resolution image can be built relatively slowly just so long as the global update frequency is greater than the flicker threshold of ~50 Hz.

Alternative embodiments include variations in the three subsystems. For example, a panel-based optical array subsystem may be realized in many different ways. Alternatives include altering the Fresnel lens to one that is effectively off-axis to match alternative folding mirror systems in order to create near normal illumination of the micro-lens arrays.

Figure 9:
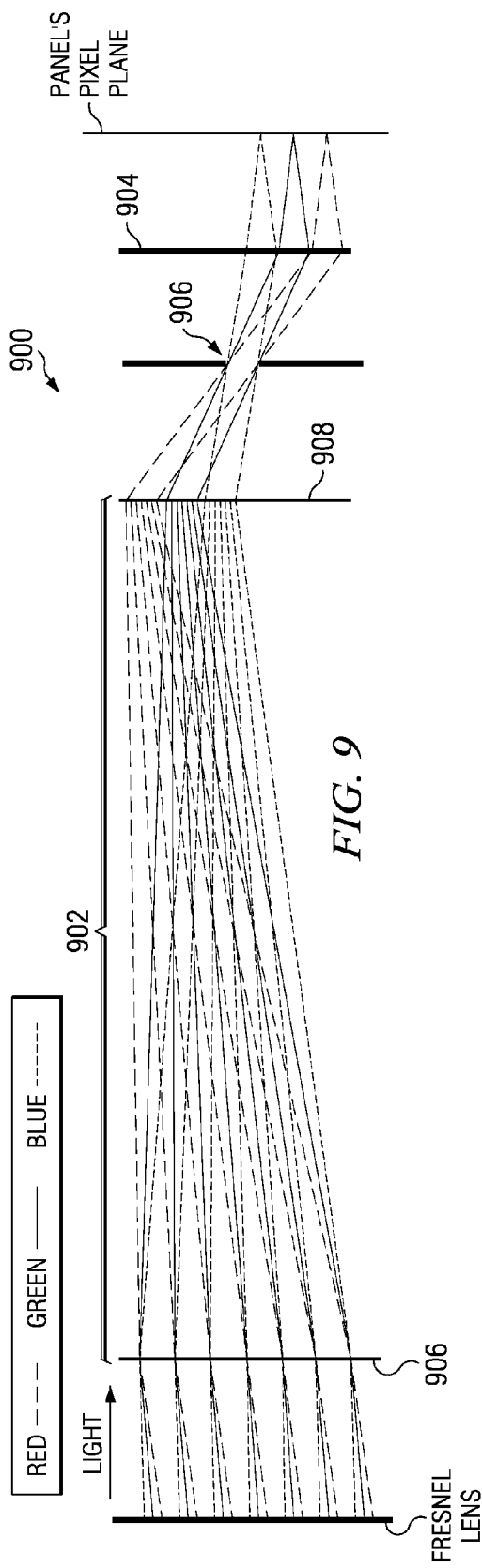
FIG. 9 is a schematic diagram illustrating a side view ray trace of a second exemplary embodiment of an OAS, in accordance with the present disclosure.

FIG. 9 is a schematic diagram illustrating a side view ray trace of another embodiment of an OAS 900. OAS 900 provides an alternative embodiment to the first embodiment of OAS 200 described in FIG. 2. OAS 900 uses an extra lens set, paired lens arrays 902 (i.e., first lens array 906 and second lens array 908) prior to the focusing lens array 904. The first lens array 906 and second lens array 908 would be mismatched in focal length, but matched in pitch to the focusing array 904. Set at a relative spacing equal to the sum of their focal lengths, this angle-transforming set may act to squeeze light through the telecentric apertures 906 with minimal light loss (assuming the LEDs are sufficiently bright).

Further embodiments could utilize very bright light sources such as lasers or very bright LEDs, which form highly collimated beams. In these cases, the light can be imaged through separate pixel regions without significant expansion and lateral displacement. A simple diffuser at the exiting panel substrate provides for a high resolution image capability with adequate viewing angle.

Figure 10:
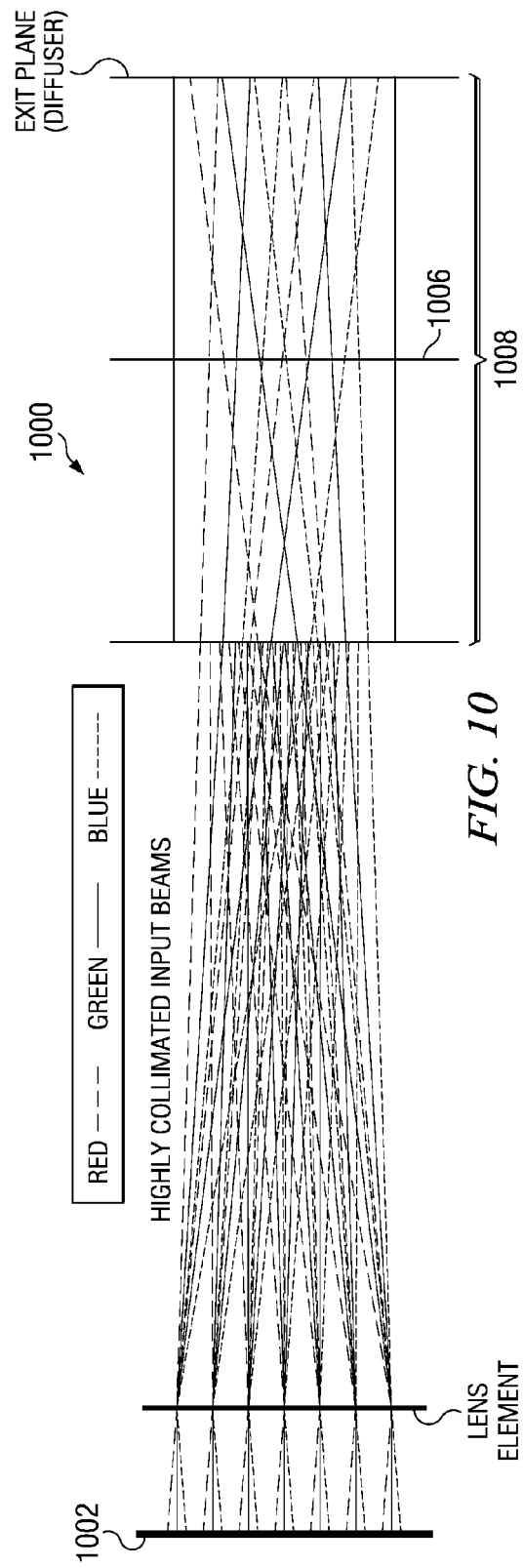
FIG. 10 is a schematic diagram illustrating a side view ray trace of a third exemplary embodiment of an OAS, in which highly collimated illumination is provided with, for example, laser sources, in accordance with the present disclosure.

FIG. 10 is a schematic diagram illustrating a side view ray trace of a third exemplary embodiment of an OAS 1000, in which highly collimated illumination is provided with, for example, laser sources. Here, light from the laser sources pass through Fresnel lens 1002 toward lens element 1004 to be imaged at the pixel plane 1006 on panel 1008. The sequential operation of directing the laser light to different sides of the pixel operates in a similar way to that described in FIGS. 7a-7d.

Figure 11:
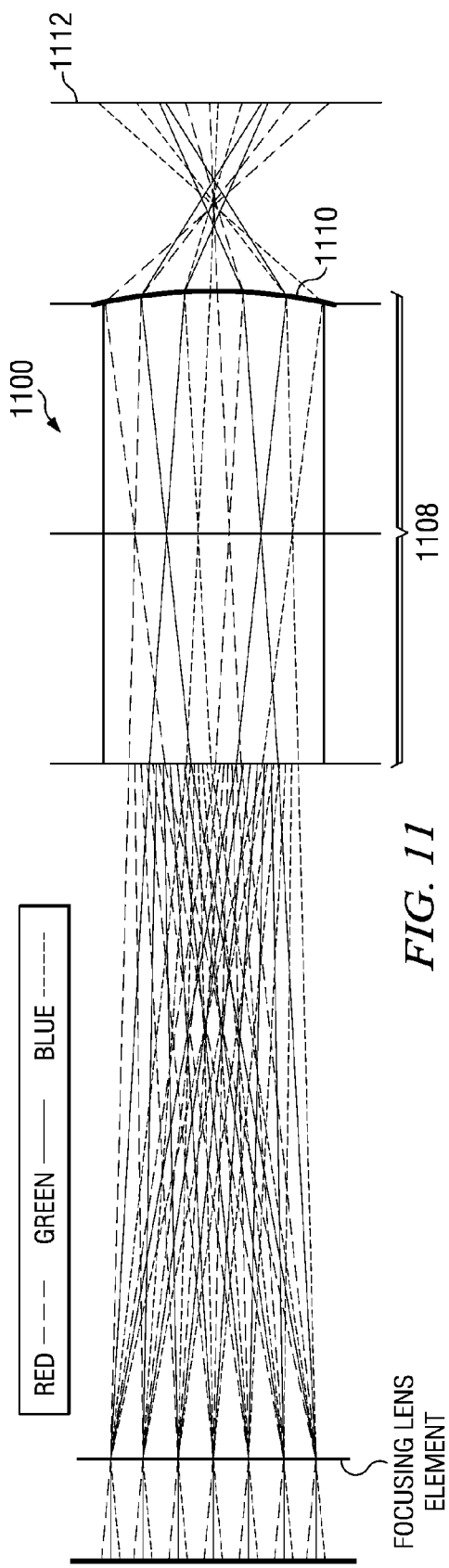
FIG. 11 is a schematic diagram illustrating a side view ray trace of a fourth exemplary embodiment of an OAS, in which the illumination patches at the pixel plane are relayed onto an external diffusing plane, in accordance with the present disclosure.

FIG. 11 is a schematic diagram illustrating a side view ray trace of a fourth exemplary embodiment of an OAS 1100, in which the illumination patches at the pixel plane are relayed onto an external diffusing plane. This embodiment includes relay lens elements 1110 in the form of an array after the panel. These relay lens elements 1110 can relay the pixel plane of the panel 1108 onto an external diffuser or collimating optic 1112. Again, the sequential operation of directing the light to different sides of the pixel operates in a similar way to that described in FIGS. 7a-7d.

Figure 12:
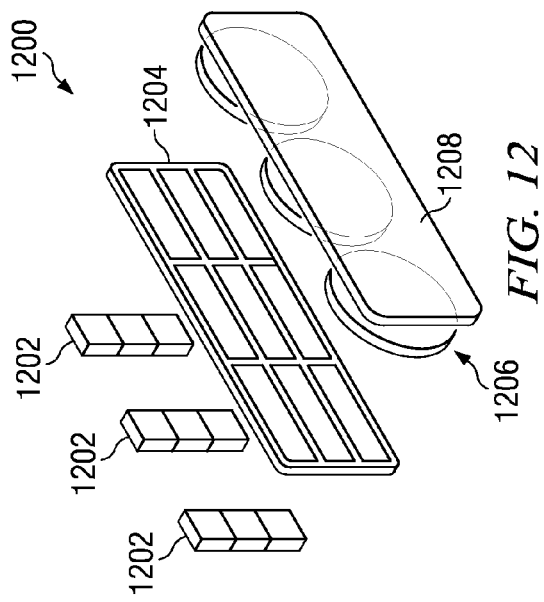
FIG. 12 is a schematic diagram illustrating a second exemplary illumination engine embodiment employing lens arrays in place of light pipes, in accordance with the present disclosure.

Variations of illumination engines include replacing the light pipes with lens arrays in the same way homogenizing systems in conventional projection systems can utilize either approach. Generally, such approaches separate angular and spatial modulation through sub-optical assemblies in one dimension, and combine in a second. For instance, FIG. 12 is a schematic diagram illustrating a second exemplary illumination engine 1200 embodiment, employing 2D lens arrays (in place of light pipes). Illumination engine 1200 includes 2D source array of LEDs 1202, 2D lens array 1204, imaging lenses 1206, and combining lens 1208. 2D lens array 1204 and imaging lens 1206 are separated by their focal lengths. In operation, this exemplary embodiment separates the local illumination in the vertical, as well as the horizontal when a matching 2D angle modulating illumination engine is used. A 2D source array of LEDs 1202 can then modulate the illumination in angular and spatial terms, as described with reference to the first embodiment.

Mechanical scanning methods such as a revolving prism may can also be used to provide scrolling operation as in projection engines to carry out the scrolling with modulated sources providing the local illumination modulation (e.g., *Displays* Vol. 23, Issue 3, June 2002, Pages 99-108, herein incorporated by reference). These embodiments may be expanded to include two dimensional mechanical scanning with a single RGB source package.

With optically coherent laser sources, diffractive manipulation devices may be utilized in related embodiments to complement the refractive approaches already discussed.

The folding mirror subsystem may include a series of plane mirrors as an extension of the single mirror approach of the first system embodiment (e.g., *Information Display* Vol. 23, No. 11, November 2007, Pages 18-23, herein incorporated by reference), but a more advanced approach may utilize curved mirrors specifically for system thickness reduction. Curved mirrors have already been implemented in projection TV products to reduce cabinet size and can be considered as off axis imaging elements (e.g., JVC RPTV models HD-58S998 and HD-65S998).

A more complex folded mirror embodiment may employ a wedge waveguide. Such structures have been proposed as part of a projection display system in U.S. Pat. No. 6,870,671, herein incorporated by reference. Implementing this approach as part of an illumination system may be much more effective as the system may be much more tolerant of scattering and distortion issues. Once again, an off-axis engine and Fresnel would preferably be used in this system.

Generally, the embodiments disclosed above combine any one of the various options for the three subsystems to provide a high resolution 2D panel whose effective pixel structure is other than that defined by the physical pixel layout. Although attractive in its own right for displaying 2D images, super-high resolution panels are particularly useful in autostereo 3D systems. Furthermore, the nature of the display is particularly compatible to those using lenticular arrays to provide angle dependent views.

Figure 13:
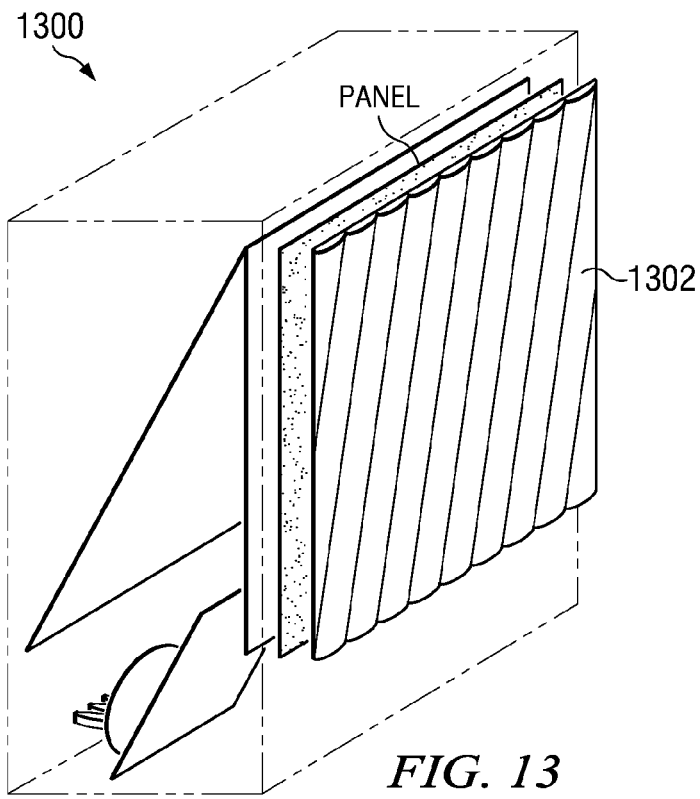
FIG. 13 is a schematic diagram illustrating an autostereoscopic display system embodiment employing an LCD with intra-pixel illumination for higher resolution and reduced pattern noise, in accordance with the present disclosure.
Figure 14:
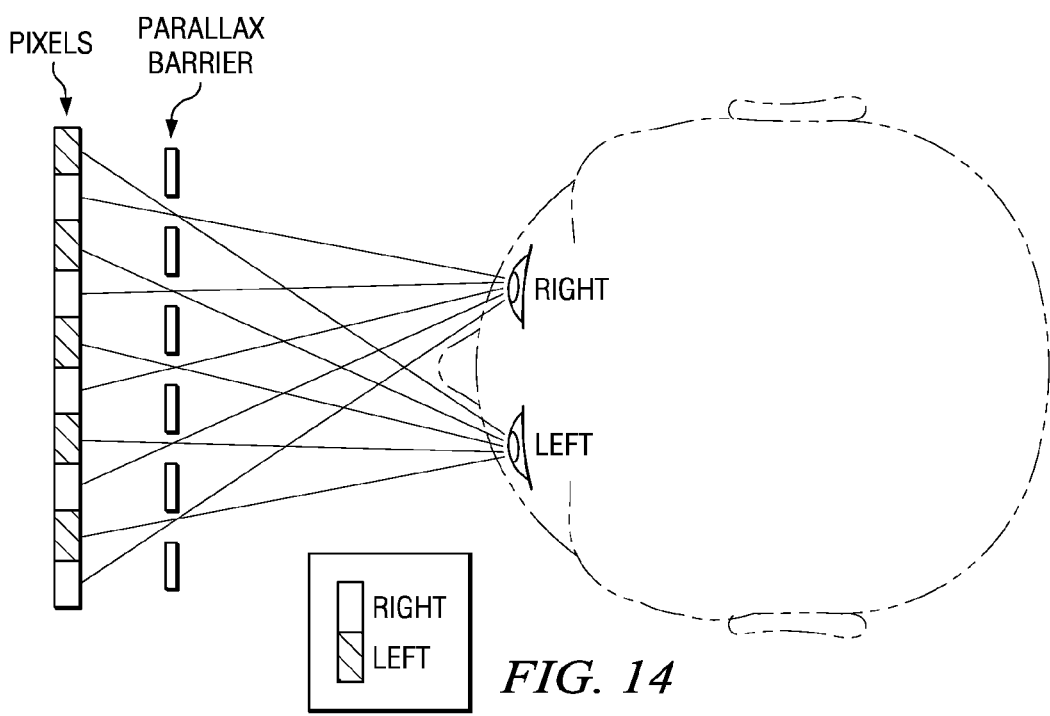
FIG. 14 is a schematic diagram illustrating the parallax barrier technique for an autostereoscopic display.
Figure 15:
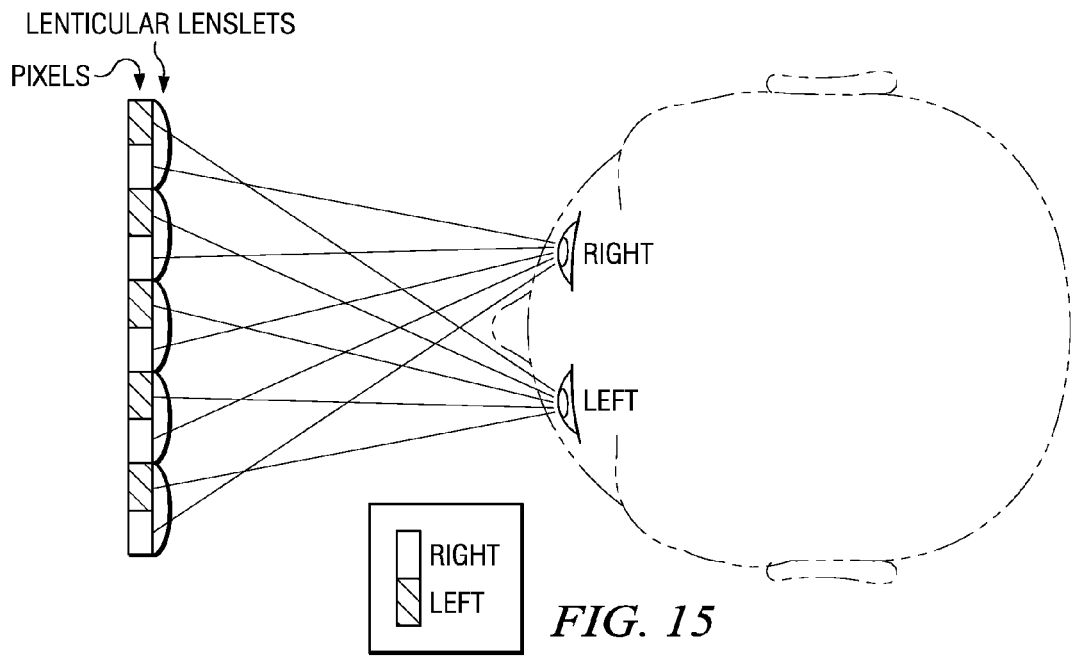
FIG. 15 is a schematic diagram illustrating the lenticular lens technique for an autostereoscopic display.
Figure 16:
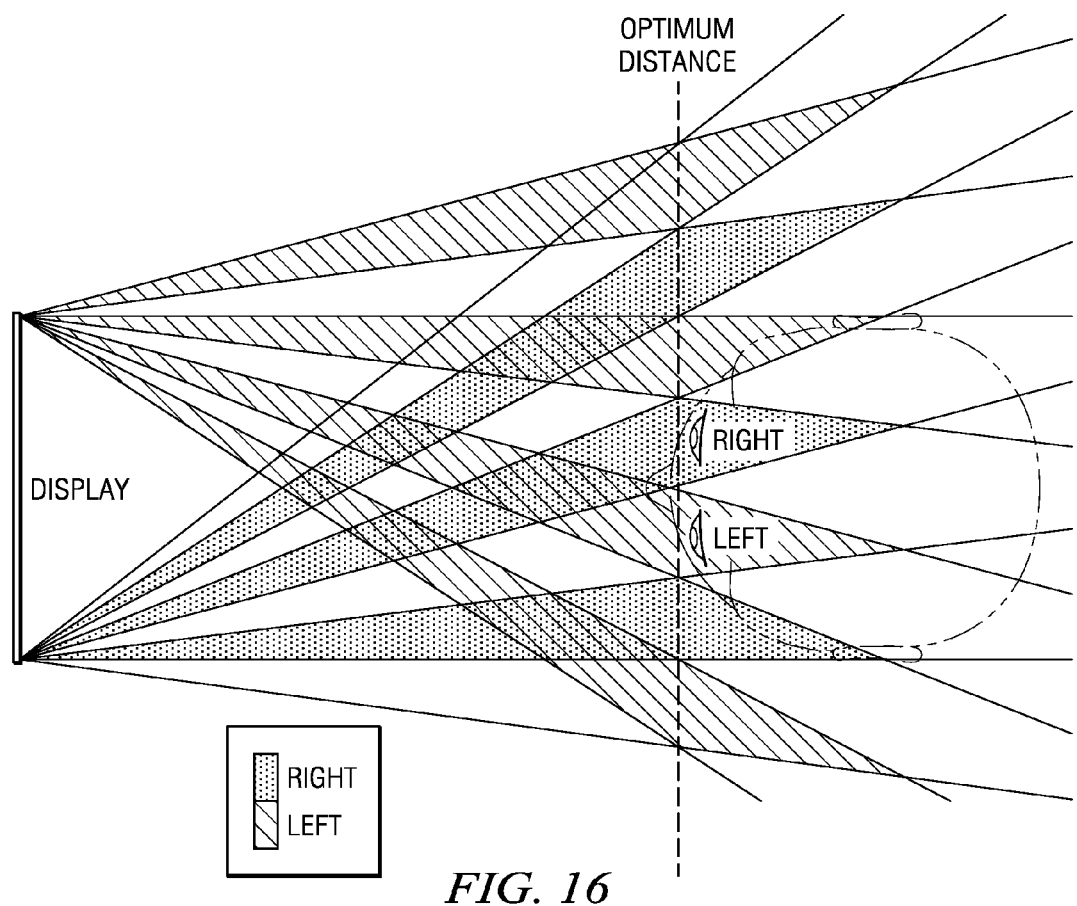
FIG. 16 is a schematic diagram illustrating that both the parallax barrier and the lenticular lens technique produce zones in which the viewer can see a 3D image and the head must be correctly aligned within these zones to comfortably view the scene.

FIG. 13 is a schematic diagram illustrating an exemplary autostereo system 1300 employing a high resolution, locally illuminated display. One such autostereo system 1300 is consistent with technology for the Synthagram developed by Stereographics Corp (See, e.g., L. Lipton and M. Feldman, "A New Autostereoscopic Display Technology: The Synthagram™," *Stereoscopic Displays and Virtual Reality Systems IX, Proc. SPIE* 4660, pp. 229-235, 2002), herein incorporated by reference. Also see U.S. Pat. No. 6,064,424, herein incorporated by reference. Here, slanted lenses are used to provide angular selection of pixels. From any given angle, a viewer will see those pixels that lie directly behind the center line of a lens element. This corresponds to only a fraction of the total number of display pixels, where the fraction depends on the number of separate images required. Since many images are necessary for a true 'look around' 3D experience, perceived resolution is compromised compared with the underlying 2D panel. Improving the resolution of already high resolution panels in the manner disclosed herein significantly enhances the performance of such an autostereo system.

Though the improved resolution lends itself to lenticular based autostereo systems, the ability to tailor the effective pixel shape and position makes it even more attractive. The prescription of the lens array 1302 may be selected to minimize pattern artifacts such as color variation over the screen and global intensity variation as a function of viewing angle. The undesirable tilt of the lens is a consequence of the latter when conventional displays are used. Pattern noise of this kind is a consequence of the sub-sampling of the regular pixel array leading to Moiré fringing effects. Reducing the size and sharpness of the effective pixel array greatly improves the ability to reduce these artifacts by suppressing the high spatial frequency terms associated with sharp edges. Furthermore, the positioning of the effective pixels other than on a rectangular grid can remove vertical black lines in the resulting image. The primary reason for tilting the lenticular array 1302 in an autostereo lenticular system is to avoid imaging the black vertical lines. When there are no continuous black lines, vertical lenses may potentially be used. Vertical lenses may be desirable, as they produce rectangular and not trapezoidal pixel regions as seen by the viewer. Text and straight lines appear broken up when represented with pixels other than rectangular.

While various embodiments in accordance with the principles disclosed herein have been described above, it should be understood that they have been presented by way of example only, and not limitation. Thus, the breadth and scope of the invention(s) should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically and by way of example, although the headings refer to a "Technical Field," the claims should not be limited by the language chosen under this heading to describe the so-called field. Further, a description of a technology in the "Background" is not to be construed as an admission that certain technology is prior art to any invention(s) in this disclosure. Neither is the "Summary" to be considered as a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings set forth herein.

What is claimed is:

1. A method for high resolution display presentation using intra-pixel illumination, the method comprising:
   at a first point in time, illuminating a plurality of first subpixel regions on a liquid crystal display (LCD) modulating panel to present a first image frame on the LCD, each of the first subpixel regions comprising a plurality of first subpixels; and
   at a second point in time, illuminating a plurality of second subpixel regions on the LCD to present a second image frame on the LCD, each of the second subpixel regions comprising a plurality of second subpixels,
   wherein each of the first and second subpixels comprise a substantially nonoverlapping region within an LCD pixel,
   wherein the first and second subpixel regions comprise substantially nonoverlapping areas of LCD pixels, and
   wherein the illuminating of the plurality of first subpixel regions comprises temporally switching colored light between at least a first color and a second color provided to the first subpixel regions.

2. The method of claim 1, wherein a subpixel is less than the size of any one individual modulating pixel of a liquid crystal display panel.

3. The method of claim 1, wherein a subpixel is substantially half of the size of any one individual modulating pixel of a liquid crystal display panel.

4. The method of claim 1, wherein the first subpixel region comprises a plurality of subpixels arranged vertically in a column of pixels on the LCD and substantially occupying the left half of the column of pixels, wherein the second subpixel region comprises a plurality of subpixels arranged vertically in the column of pixels on the LCD and substantially occupying the right half of the column of pixels.

5. The method of claim 1, further comprising:
   at a third point in time, illuminating a plurality of third subpixel regions on the LCD modulating panel; and
   wherein the first, second, and third subpixel regions comprise substantially nonoverlapping areas of LCD pixels.

6. The method of claim 1, further comprising:
   activating a first set of light sources at the first point in time;
   optically replicating light from the first set of light sources; and
   projecting the optically replicated light toward the plurality of first subpixel regions.

7. The method of claim 6, further comprising:
   activating a second set of light sources at the second point in time;
   optically replicating light from the second set of light sources; and
   projecting the optically replicated light toward the plurality of second subpixel regions.

8. The method of claim 6, wherein the first and second set of light sources comprise red, green, and blue light emitting diodes.

9. The method of claim 1, wherein each subpixel region is illuminated with one of red, blue, or green colored light, wherein the subpixel illumination temporally cycles between the red, blue, and green colored light in each subpixel region to provide a uniform white spatially-averaged illumination to the LCD.

10. The method of claim 1, further comprising scrolling through a plurality of scrolling stripe regions to hide display transition periods.

11. The method of claim 10, further comprising selectively illuminating the scrolling stripe regions to provide scrolling illumination on the LCD panel synchronized with addressing of the LCD panel modulation.

12. The method according to claim 1, further comprising providing red, green, and blue light in angularly separated color beams to a cylindrical lens array operable to direct the light toward one of the first and second subpixel regions.

13. The method of claim 1, wherein illumination of the first subpixel regions illuminates a first image destined for a left eye, and wherein illumination of the second subpixel regions illuminates a second image destined for a right eye.

14. The method of claim 13, further comprising directing light from the first subpixel region to the left eye and directing light from the second region to the right eye with a lenticular array located in the light path after the LCD modulating panel.

15. A method for illuminating a liquid crystal display (LCD) panel, the method comprising:
   providing the LCD panel, wherein a pixel in the LCD panel comprises a left subpixel and a right subpixel, and wherein a first set of subpixels substantially comprise left subpixels,
   wherein the second set of subpixels substantially comprise right subpixels, and wherein each of the left and right subpixels comprise a substantially nonoverlapping region within the pixel in the LCD panel;
   illuminating the left subpixels in a first scrolling stripe region to present a first image destined for a left eye on the LCD;
   illuminating the left subpixels in a second scrolling stripe region;
   illuminating the right subpixels in the first scrolling stripe region to present a second image destined for a right eye on the LCD; and
   illuminating the right subpixels in the second scrolling stripe region.

16. The method of claim 15, wherein the light illuminating the first set of subpixels comprises light originating from a first set of light emitting diodes, and wherein the light illuminating the second set of subpixels comprises light originating from a second set of light emitting diodes.

17. The method of claim 15, wherein the first set of subpixels in the first scrolling stripe region is illuminated in a first time phase, and wherein the first set of subpixels in the second scrolling stripe region is illuminated in a second time phase.

18. The method of claim 16, wherein the second time phase follows the first time phase in time.

19. The method of claim 16, wherein the second time phase at least partially overlaps the first time phase in time.

20. The method of claim 15, further comprising:
   illuminating the left subpixels in a third scrolling stripe region; and
   illuminating the right subpixels in the third scrolling stripe region.

21. The method of claim 15, wherein the first and second scrolling stripe regions are illuminated at different periods of the LCD panel's addressing cycle.

22. The method of claim 15, further comprising:
generating first light from a first set of LEDs and directing the first light toward the left subpixels on the LCD panel; and
generating second light from a second set of LEDs and directing the second light toward the right subpixels on the LCD panel,
wherein light incident on each subpixel is one of red, green, and blue light.

23. The method according to claim 22, further comprising providing the red, green, and blue light in angularly separated color beams to a cylindrical lens array operable to direct the first light toward the left subpixels on the LCD panel, and further operable to direct the second light toward the right subpixels on the LCD panel.

24. The method of claim 15, wherein selective illumination of the scrolling stripe regions provide scrolling illumination on the LCD panel synchronized with addressing of the LCD panel modulation.

25. The method of claim 15, wherein the scrolling stripe regions are created by temporally illuminating a lenticular sheet with light beams from one of a first and a second set of LEDs, the colored light beams having distinct incident angles.

26. The method of claim 15, wherein illumination of the first set of subpixels illuminates a first image destined for a left eye, and wherein illumination of the second set of subpixels illuminates a second image destined for a right eye.

27. The method of claim 15, wherein light is imaged on a diffuser prior to the LCD panel.

28. A direct view visual display comprising:
a liquid crystal (LC) modulating panel;
a temporally modulated illumination source engine operable to generate first light and second light;
a micro-optical array subsystem adjacent the LC modulating panel, and operable to direct the first light from the illumination source engine to a plurality of first subpixel regions on the LC modulating panel to present a first image frame on the LC modulating panel,
each of the first subpixel regions comprising a plurality of first subpixels, and operable to direct the second light from the illumination source engine to a plurality of second subpixel regions on the LC modulating panel to present a second image frame on the LC modulating panel,
each of the second subpixel regions comprising a plurality of second subpixels,
wherein each of the first and second subpixels comprise a substantially nonoverlapping region within an LC modulating panel pixel,
wherein the first and second subpixel regions comprise substantially nonoverlapping areas of LCD pixels, and
wherein the directing of the first light from the illumination source engine to the plurality of first subpixel regions comprises temporally switching the first light between at least a first color and a second color.

29. The direct view visual display of claim 28, further comprising a cylindrical lens array operable to direct the first light toward the first subpixel regions on the LC modulating panel, and further operable to direct the second light toward the second subpixel regions on the LC modulating panel.

30. The direct view visual display of claim 28, further comprising a controller operable to drive the illumination source engine to provide the first light and the second light.

* * * * *